(12) United States Patent
Lin et al.

(10) Patent No.: US 8,379,336 B2
(45) Date of Patent: Feb. 19, 2013

(54) LENS MODULE

(75) Inventors: Hou-Yao Lin, Taipei Hsien (TW); Sheng-Jung Yu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 337 days.

(21) Appl. No.: 12/699,994

(22) Filed: Feb. 4, 2010

(65) Prior Publication Data

US 2011/0002054 A1 Jan. 6, 2011

(30) Foreign Application Priority Data

Jul. 2, 2009 (CN) .......................... 2009 1 0303947

(51) Int. Cl.
*G02B 7/02* (2006.01)
(52) U.S. Cl. .................. 359/822; 359/811; 359/819
(58) Field of Classification Search ........... 359/819–830
See application file for complete search history.

(56) References Cited

U.S. PATENT DOCUMENTS

| 7,495,843 | B2 * | 2/2009 | Ge et al. ........................ 359/699 |
| 7,880,984 | B2 * | 2/2011 | Yen ................................ 359/822 |
| 2002/0027725 | A1 * | 3/2002 | Schletterer .................... 359/811 |
| 2007/0047110 | A1 | 3/2007 | Matsushima |
| 2009/0290240 | A1 * | 11/2009 | Chang et al. .................. 359/822 |
| 2010/0328789 | A1 * | 12/2010 | Yen ................................ 359/822 |

FOREIGN PATENT DOCUMENTS

| CN | 101122664 A | 2/2008 |
| CN | 101210990 A | 7/2008 |

* cited by examiner

*Primary Examiner* — Ricky Mack
*Assistant Examiner* — Mahidere Sahle
(74) *Attorney, Agent, or Firm* — Altis Law Group, Inc.

(57) ABSTRACT

An exemplary lens module includes a lens barrel, and a first adjustable lens received in the lens barrel. The lens barrel includes a circumferential sidewall. The lens barrel also defines an accommodating cavity therein for receiving the first adjustable lens therein. The circumferential sidewall of the lens barrel defines an adjusting through hole therein. The adjusting through hole communicates with the accommodating cavity. The first adjustable lens has a circumferential side surface. The circumferential side surface defines a first adjusting notch therein. The first adjusting notch communicates with the adjusting through hole.

5 Claims, 4 Drawing Sheets

LENS MODULE

BACKGROUND

1. Technical Field

The present disclosure relates to optical imaging and particularly, to a lens module.

2. Description of Related Art

Generally, a lens module includes a barrel and a plurality of optical elements (e.g., lenses, and infrared-cut filters) received in the barrel. In assembly, the optical elements are assembled into the barrel. However, eccentricities in the assembly of the lens module such as misalignment issues between the optical axis of the first lens, other lens, or with the imaging sensor adversely affect imaging quality.

Therefore, a new lens module is desired to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Embodiments will now be described in detail below with reference to the drawings.

Figure 1:
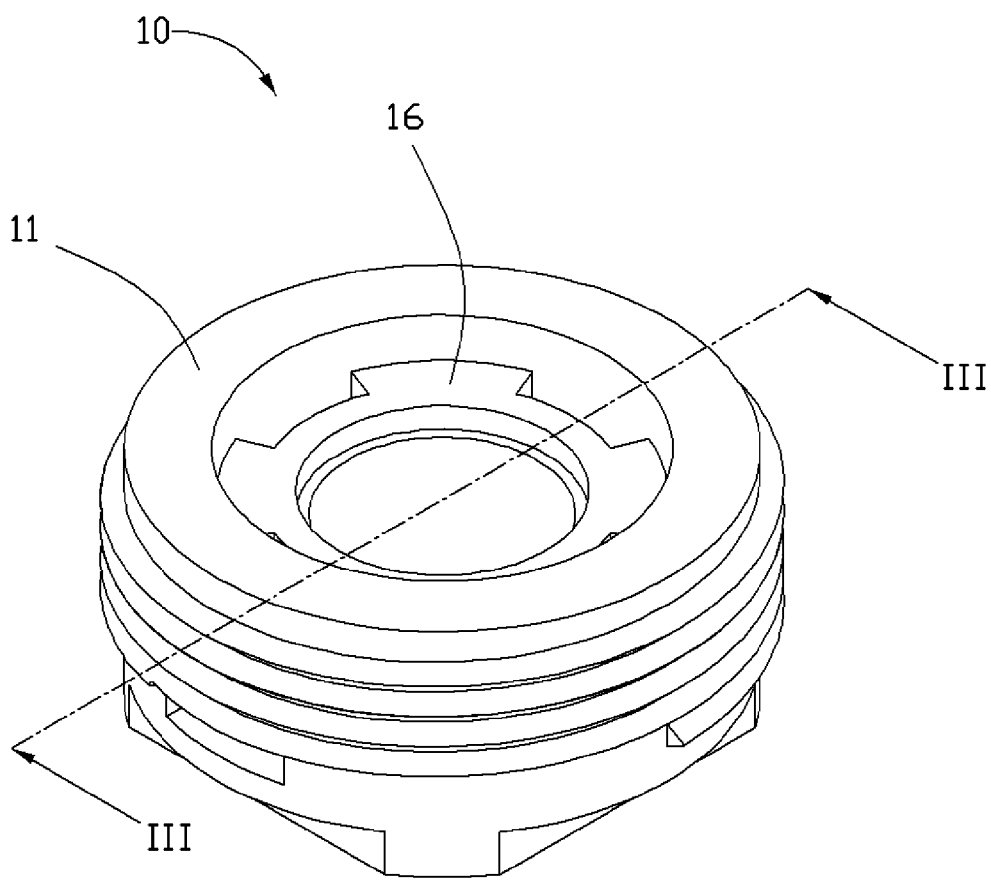
FIG. 1 is a perspective view of a lens module according to a first embodiment.
Figure 2:
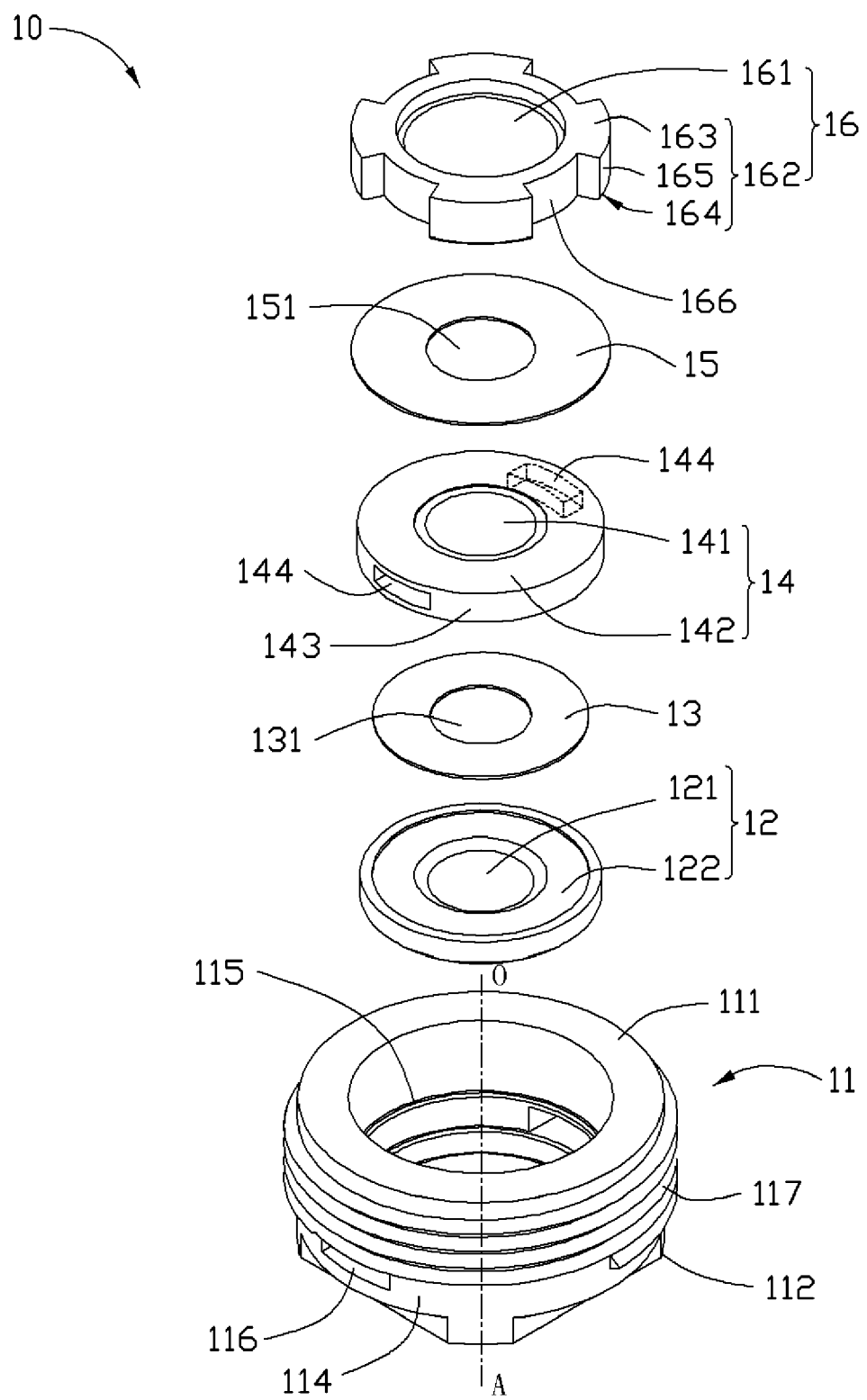
FIG. 2 is an exploded perspective view of the lens module of FIG. 1.
Figure 3:
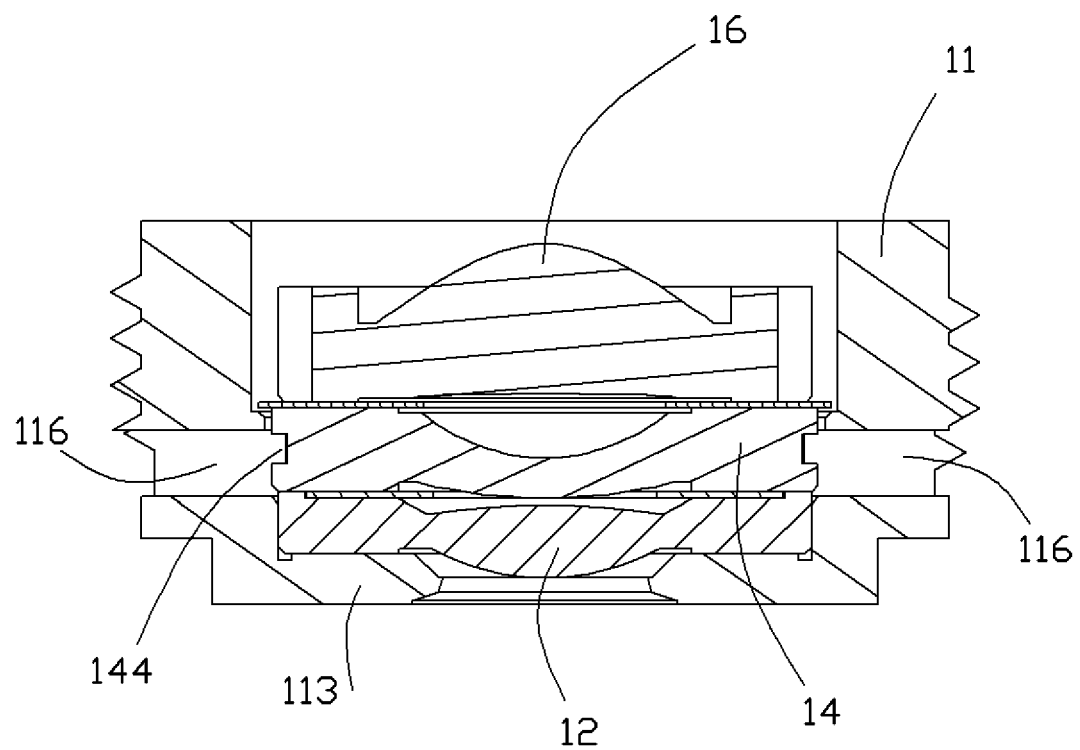
FIG. 3 is a sectional view of the lens module of FIG. 1, taken along the line III-III thereof.

Referring to FIGS. 1-3, a lens module 10 according to a first embodiment is shown. The lens module 10 includes a lens barrel 11, a lens 12, a first spacer 13, a first adjustable lens 14, a second spacer 15, and a second adjustable lens 16.

The lens barrel 11 is substantially a hollow cylinder, having a first open end 111, an opposite second open end 112, a lip 113 extending inward from a periphery of the second open end 112, and a circumferential sidewall 114 between the first open end 111 and the second open end 112. The lens barrel 11 also defines an accommodating cavity 115 therein. The lens 12, the first spacer 13, the first adjustable lens 14, the second spacer 15, and the second adjustable lens 16 are received in the accommodating cavity 115 from an object side to an image side in the order written. The circumferential sidewall 114 of the lens barrel 11 further defines a plurality of adjusting through holes 116 communicating with the accommodating cavity 115. The adjusting through holes 116 are in a plane perpendicular to the central axis OA of the lens barrel 11. Each adjusting through hole 116 is arc-shaped, and extends along the circumference of the lens barrel 11. Advantageously, the cylindrical wall of the lens barrel 11 has a plurality of outer threads 117 formed thereon so that the lens barrel 11 can be screwed to a holder (not shown).

The lens 12 is received in the accommodating cavity 115, and adjoins the lip 113 of the lens barrel 11. The lens 12 is a substantially round lens, and includes a central optically active part 121 and a peripheral optically inactive part 122 surrounding the active part 121.

The first spacer 13 is received in the accommodating cavity 115, and is located between the lens 11 and the first adjustable lens 12 for creating a space between the lens 11 and the first adjustable lens 12. The first spacer 13 is substantially ring-shaped, and defines a through hole 131 at the center thereof. The through hole 131 corresponds to the optically active part 121 enabling passage of light through the spacer 13.

The first adjustable lens 14 is received in the accommodating cavity 115, and is located between the first spacer 13 and the second spacer 15. The first adjustable lens 14 is a substantially round lens, and includes a central optically active part 141 and a peripheral optically inactive part 142 surrounding the optically active part 141. The peripheral optically inactive part 142 includes a circumferential side surface 143 surrounding the central optically active part 141. The circumferential side surface 143 defines a plurality of spaced first adjusting notches 144 therein. The first adjusting notches 143 correspond to, and communicate with the respective through holes 115.

It should be noted that in alternative embodiments, the first adjustable lens 14 can include only one first adjusting notch 144.

The second spacer 15 is received in the accommodating cavity 115, and is located between the first adjustable lens 14 and the second adjustable lens 16 for creating a space between the first adjustable lens 11 and the second adjustable lens 12. The second spacer 15 is substantially ring-shaped, and defines a through hole 151 at the center thereof. The through hole 151 corresponds to the optically active part 141 enabling passage of light through the spacer 15.

The second adjustable lens 16 is received in the accommodating cavity 115, and above the second spacer 15. Similar to the lens 12 and the first adjustable lenses 14, the second adjustable lens 16 includes a central optically active part 161, and a peripheral optically inactive part 162. The peripheral optically inactive part 162 includes a top surface 163, a bottom surface 164, and a ring-shaped connecting surface 165 between the top surface 163 and the bottom surface 164. The top surface 163 defines a plurality of spaced second adjusting notches 166 at a periphery thereof. Each second adjusting notch 166 is arc-shaped and extends along the circumference of the second adjustable lens 16. In the present embodiment, each second adjusting notch 166 not only runs through the ring-shaped connecting surface 165, but also the bottom surface 164.

In alternative embodiments, each second adjusting notch 166 may run through the bottom surface 164, but not through the ring-shaped connecting surface 165.

In other alternative embodiments, each first adjusting notch 166 may neither run through the ring-shaped connecting surface 165, nor the bottom surface 164.

A method for making the lens module 10 is also provided as follows.

First, the lens 12, the spacer 13, and the first adjustable lens 14 are assembled into the lens barrel 11 sequentially to form a semi-finished lens module (not shown), such that at least a part of each first adjusting notch 144 communicates with one of the adjusting through hole 116.

Second, the semi-finished lens module is measured to check for any eccentricities. If eccentricity exists, an adjusting member such as a rod or other stick-like apparatus (not shown) is inserted into a first adjusting notch 144 of the first adjustable lens 14 via the corresponding adjusting through hole 116 to drive the first adjustable lens 14 to, for example, rotate clockwise until the eccentricity is reduced or eliminated. Thus, the eccentricity of the semi-finished lens module can usually be corrected.

Third, an adhesive can be applied to the first adjustable lens 14 to securely fix the first adjustable lens 14 with the lens barrel 11.

Fourth, the second spacer 15 and the second adjustable lens 16 are assembled into the lens barrel 11 sequentially to form the lens module 10.

Fifth, the lens module 10 is measured to check for any eccentricities. If eccentricity exists, the adjusting member is inserted into a second adjusting notch 166 of the second adjustable lens 16 to drive the second adjustable lens 16 to, for example, rotate counterclockwise until the eccentricity is reduced or eliminated. Thus, the eccentricity of the lens module 10 can usually be corrected.

Finally, an adhesive can be applied to the second adjustable lens 16 to securely fasten the second adjustable lens 16 onto the lens barrel 11.

When an eccentricity occurs in the lens module 10, the eccentricity is reduced or eliminated by using the above-described method due to the configuration of the lens module 10 (e.g., the first adjusting notches 144 in the first adjustable lens 14, the adjusting through holes 116 of the lens barrel 11, and the second adjusting notches 166 in the second adjustable lens 16). Accordingly, imaging quality of the lens module 10 is greatly enhanced.

Figure 4:
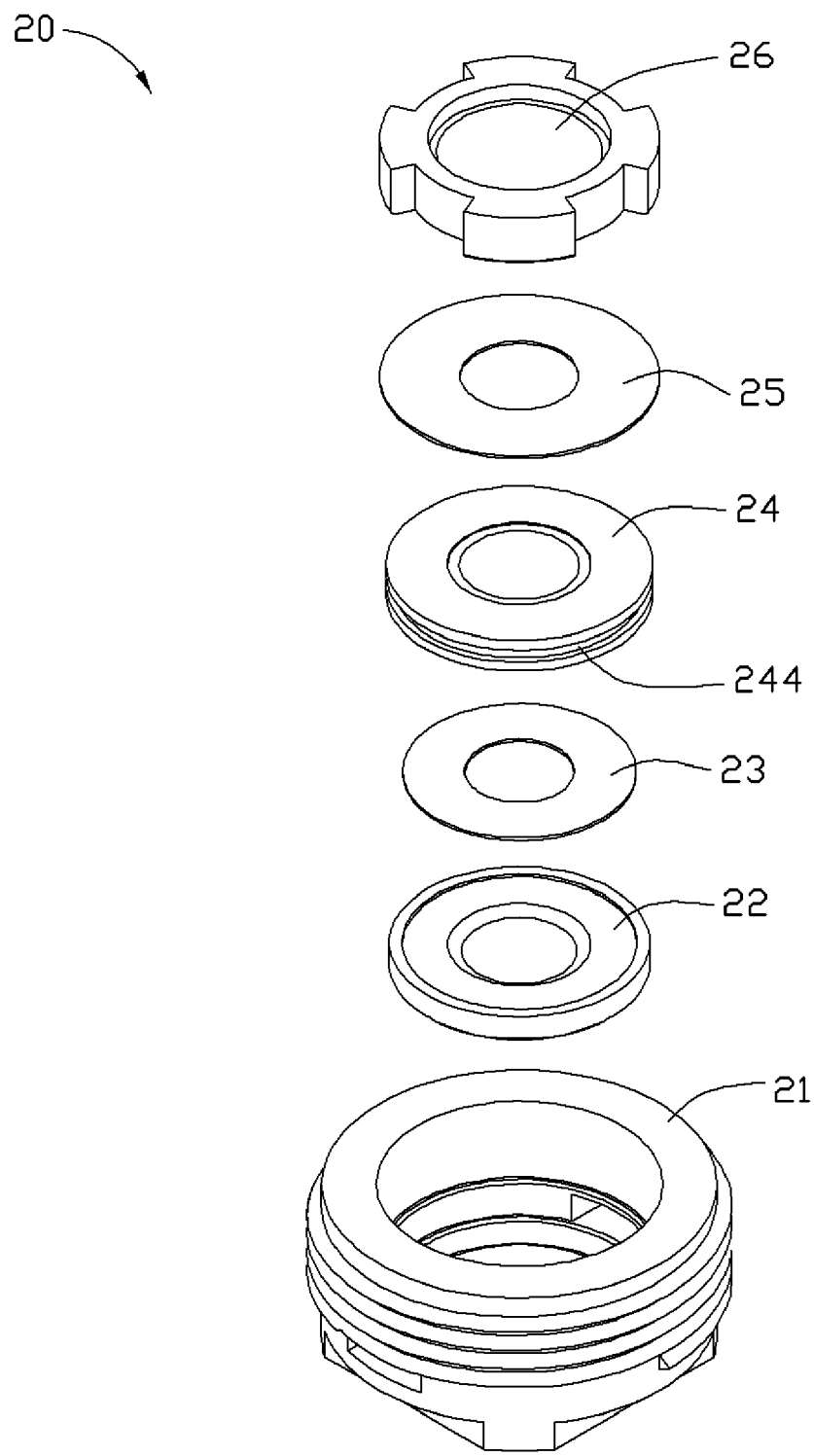
FIG. 4 is an exploded perspective view of a lens module according to a second embodiment.

Referring to FIG. 4, a lens module 20 similar to the lens module 10, in accordance with a second embodiment, is shown. The lens module 20 includes a lens barrel 21, a lens 22, a first spacer 23, a first adjustable lens 24 having a first adjusting notch 244, a second spacer 25, and a second adjustable lens 26. In the present embodiment, the first adjusting notch 244 is a ring-shaped concavity defined in the circumferential side surface of the first adjustable lens 24.

While certain embodiments have been described and exemplified above, various other embodiments from the foregoing disclosure will be apparent to those skilled in the art. The present disclosure is not limited to the particular embodiments described and exemplified but is capable of considerable variation and modification without departure from the scope and spirit of the appended claims.

What is claimed is:
1. A lens module comprising:
a lens barrel comprising a circumferential sidewall, an accommodating cavity defined therein, and an adjusting through hole defined in the circumferential sidewall, the adjusting through hole communicating with the accommodating cavity; a first adjustable lens received in the accommodating cavity of the lens barrel, the first adjustable lens being a round lens, and having a circumferential side surface, the circumferential side surface having a first adjusting notch defined therein, the first adjusting notch communicating with the adjusting through hole; and
a second adjustable lens above the first adjusting lens, the second adjustable lens comprising a second adjusting notch at a periphery thereof, a central optically active part, and a peripheral optically active part surrounding the central optically active part, the peripheral optically active part comprising a top surface, a bottom surface, and a ring-shaped connecting surface between the top surface and the bottom surface, the top surface defining the second adjusting notch, and the second adjusting notch running through the bottom surface, but not through the ring-shaped connecting surface; and
a spacer received in the accommodating cavity of the lens barrel, the spacer located between the first and second adjustable lenses.

2. A lens module comprising:
a lens barrel comprising a circumferential sidewall, an accommodating cavity defined therein, and an adjusting through hole defined in the circumferential sidewall, the adjusting through hole communicating with the accommodating cavity; a first adjustable lens received in the accommodating cavity of the lens barrel, the first adjustable lens being a round lens, and having a circumferential side surface, the circumferential side surface having a first adjusting notch defined therein, the first adjusting notch communicating with the adjusting through hole; and
a second adjustable lens above the first adjusting lens, the second adjustable lens comprising a second adjusting notch at a periphery thereof, a central optically active part, and a peripheral optically active part surrounding the central optically active part, the peripheral optically active part comprising a top surface, a bottom surface, and a ring-shaped connecting surface between the top surface and the bottom surface, the top surface defining the second adjusting notch, the second adjusting notch neither runs through the ring-shaped connecting surface, nor through the bottom surface.

3. The lens module of claim 1, wherein the first adjustable lens is a round lens, and the first adjusting notch is a ring-shaped concavity defined in the circumferential side surface of the first adjustable lens.

4. The lens module of claim 2, further comprising a spacer received in the accommodating cavity of the lens barrel, the spacer being located between the first and second adjustable lenses.

5. The lens module of claim 4, wherein the first adjustable lens is a round lens, and the first adjusting notch is a ring-shaped concavity defined in the circumferential side surface of the first adjustable lens.

* * * * *